July 27, 1954

H. A. J. SILLEY ET AL 2,684,762

APPARATUS FOR SEPARATING IMMISCIBLE LIQUIDS
OR LIQUIDS AND INSOLUBLE SOLIDS

Filed Jan. 29, 1951

Inventors
Henry A. J. Silley
George R. Unthank
By Ralph B. Stewart
attorney.

July 27, 1954  H. A. J. SILLEY ET AL  2,684,762
APPARATUS FOR SEPARATING IMMISCIBLE LIQUIDS
OR LIQUIDS AND INSOLUBLE SOLIDS
Filed Jan. 29, 1951   3 Sheets-Sheet 3
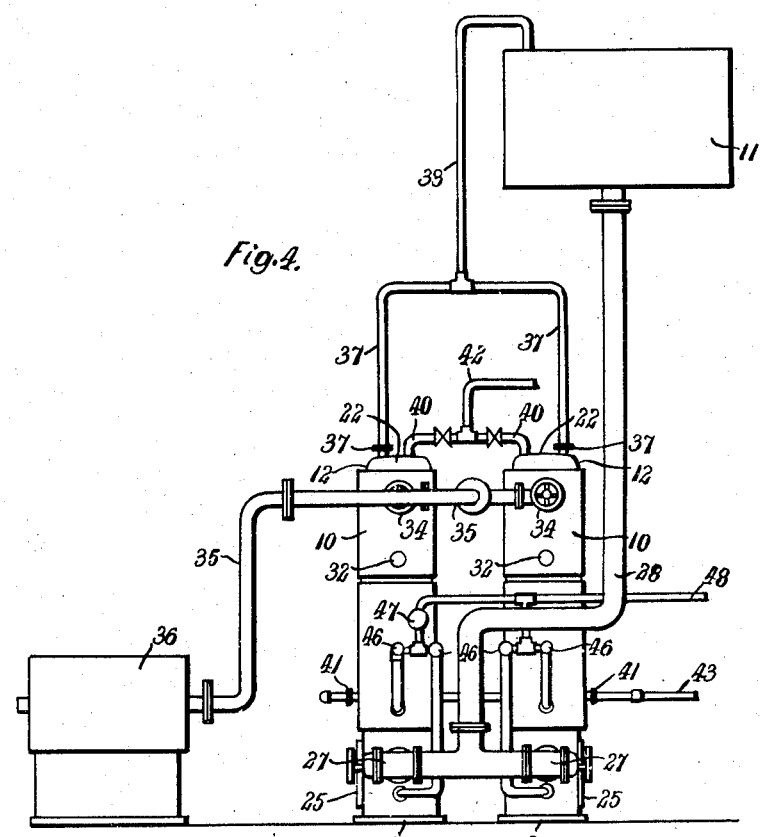
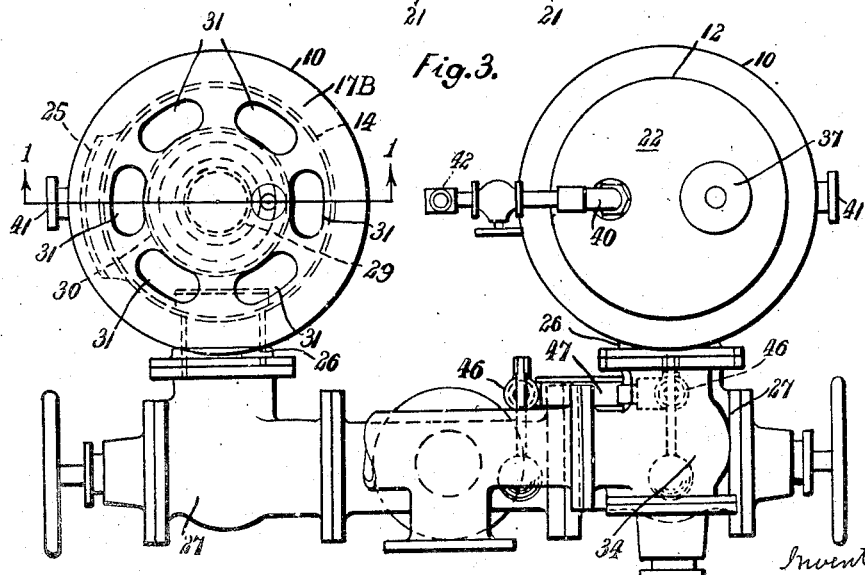

Patented July 27, 1954

2,684,762

UNITED STATES PATENT OFFICE 2,684,762

APPARATUS FOR SEPARATING IMMISCIBLE LIQUIDS OR LIQUIDS AND INSOLUBLE SOLIDS

Henry A. J. Silley and George R. Unthank,
London, England

Application January 29, 1951, Serial No. 208,316

3 Claims. (Cl. 210—52.5)

1

This invention relates to apparatus for separating liquids which are immiscible with each other or liquids and insoluble solids and of the kind in which the mixture of liquids or liquids and solids is heated by any suitable heating means to reduce the viscosity of the mixture, thus enabling its constituents to be separated by virtue of a difference in their specific gravities. The invention relates especially but not exclusively to such apparatus for separating small quantities of a liquid impurity (e. g. water) from another liquid (e. g. fuel oil).

The principal object of this invention is to provide apparatus of the kind specified which is more efficient than apparatus hitherto known.

According to this invention, apparatus of the kind specified includes an annular conduit having its longitudinal axis vertical, means for introducing a mixture to be separated into the top end of the conduit, heating means located within the conduit and formed in the shape of a helix coaxial with the conduit, the heating means being spaced approximately equidistantly from the adjacent conduit surfaces, means for causing an appreciable change in the direction of flow of the mixture upon its emergence from the bottom end of said conduit and a chamber surrounding the bottom end of the conduit and provided with an outlet for removing at will a constituent or constituents of the mixture deposited within the chamber.

In such apparatus it may be arranged that the walls of the conduit are thermally-conducting and that a first passage, through which the mixture which is to be introduced into the top of the conduit passes, has as a boundary wall at least a part of one wall of the annular conduit and a second passage, through which the mixture which has emerged from the conduit passes, has as a boundary wall at least a part of the other wall of the annular conduit.

It may be arranged that the inner wall of the conduit forms a boundary wall of said first passage and the outer wall of the conduit forms a boundary wall of said second passage.

A particular embodiment, consisting of an installation for separating small quantities of water from fuel oil, will now be described, by way of example, with reference to the accompanying drawings wherein—

Figure 1 is an elevational view of two similar separators connected for operation in parallel, the separator on the right-hand side of the drawing being shown in elevation and that on the left-hand side being shown in section taken on the line 1—1 in Figure 3.

2

Figure 3 is a plan view of the two separators shown in Figure 1, that on the left-hand side being shown in section taken on the line 3—3 in Figure 1.

Figure 4 is a diagrammatic elevational view of an installation including two separators as shown in Figure 1.

Figure 1:
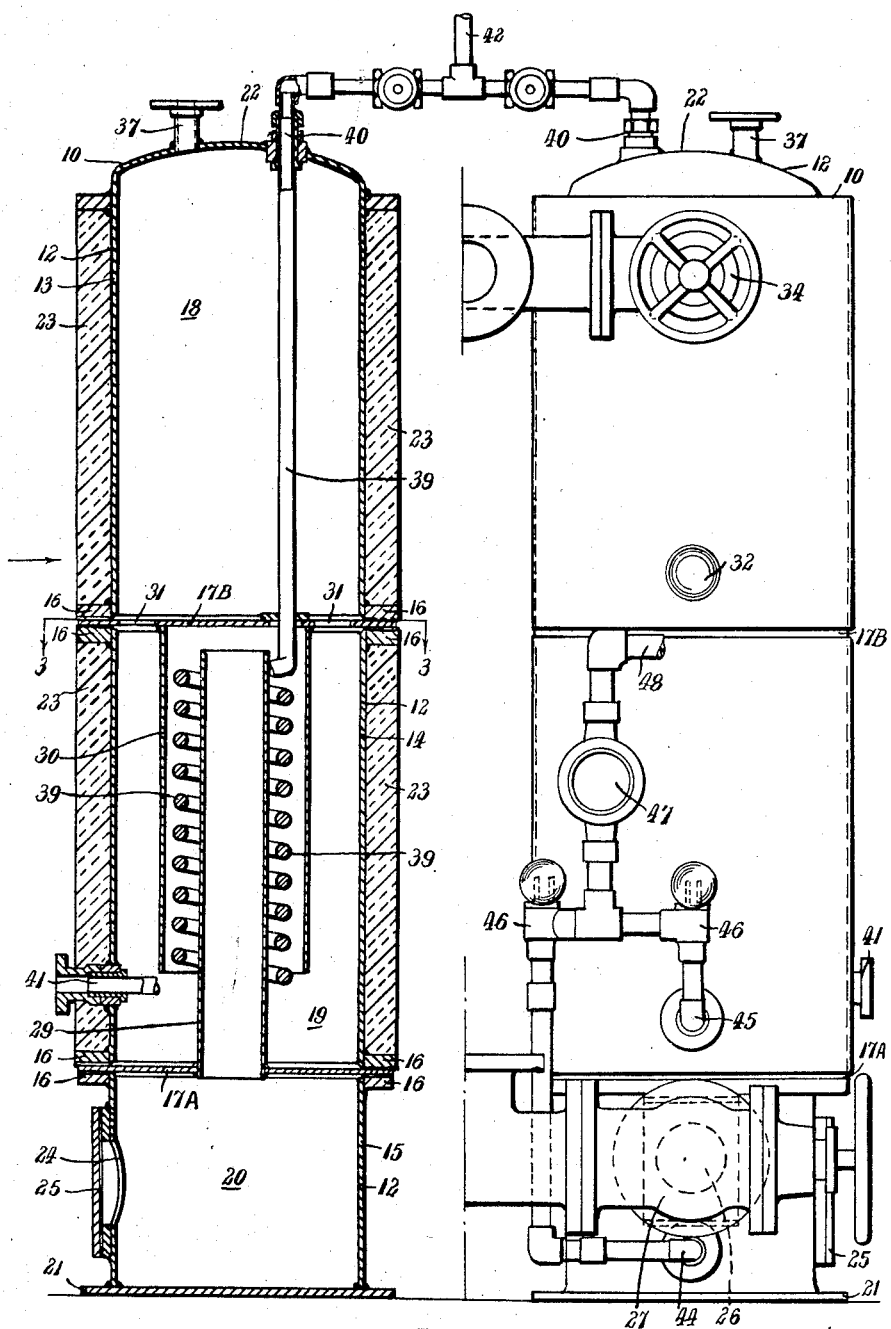

The installation consists of two separators 10 connected in parallel, both being used at once or, alternatively, only one being used whilst the other is taken out of service for cleaning. The oil is fed to the separators by gravity from an auxiliary tank 11 (Figure 4). Each separator consists of a cylindrical shell 12 having its longitudinal axis vertical. The shell is formed from three separate cylindrical sections 13, 14 and 15 which are clamped together, end to end, by bolts (not shown) passing through flanges 16 provided around their abutting edges. A partition 17A or 17B is sandwiched between each adjacent two sections so that the shell is divided into three separate chambers 18, 19 and 20. The lowest section 15 has its bottom edge welded to a base plate 21. The chamber between the base plate 21 and the partition 17A will be called the lowest chamber 20, that between the two partitions 17A and 17B will be called the middle chamber 19 and the remaining chamber will be called the top chamber 18. The top end 22 of the chamber 18 is domed and the chambers 18 and 19 are lagged with a layer 23 of any suitable heat insulating material.

The chamber 20 is provided with an inspection port 24 (Figure 1) which is normally closed by a cover 25 bolted onto the outside of the shell. A horizontal oil supply pipe 26 opens into the chamber 20 and is connected through a valve 27 to a common main oil supply pipe 28 (Figure 4) leading to the auxiliary tank 11.

The chamber 20 communicates with the chamber 19 through two coaxial inner and outer tubes 29 and 30 forming a labyrinth, the common axis of the two tubes coinciding with the vertical axis of the separator. The inner tube 29 is welded to the upper side of the partition 17A (a hole being provided in the partition) and projects vertically upwards into the chamber 19. The outer tube 30 surrounds the inner tube 29, is welded to the under side of the partition 17B and projects vertically downwards into the chamber 19. The chamber 19 communicates with the chamber 18 through apertures 31 in the annular portion of the partition 17B between the outer tube 30 and the shell 12. Thus, oil passes from the chamber 20 upwards into the inner tube 29, downwards into the annular passage between the two tubes 29 and 30, upwards into the annular passage between the outer tube 30 and the shell 12 and then upwards through the apertures 31 in the partition 17B into the chamber 18.

Figure 2:
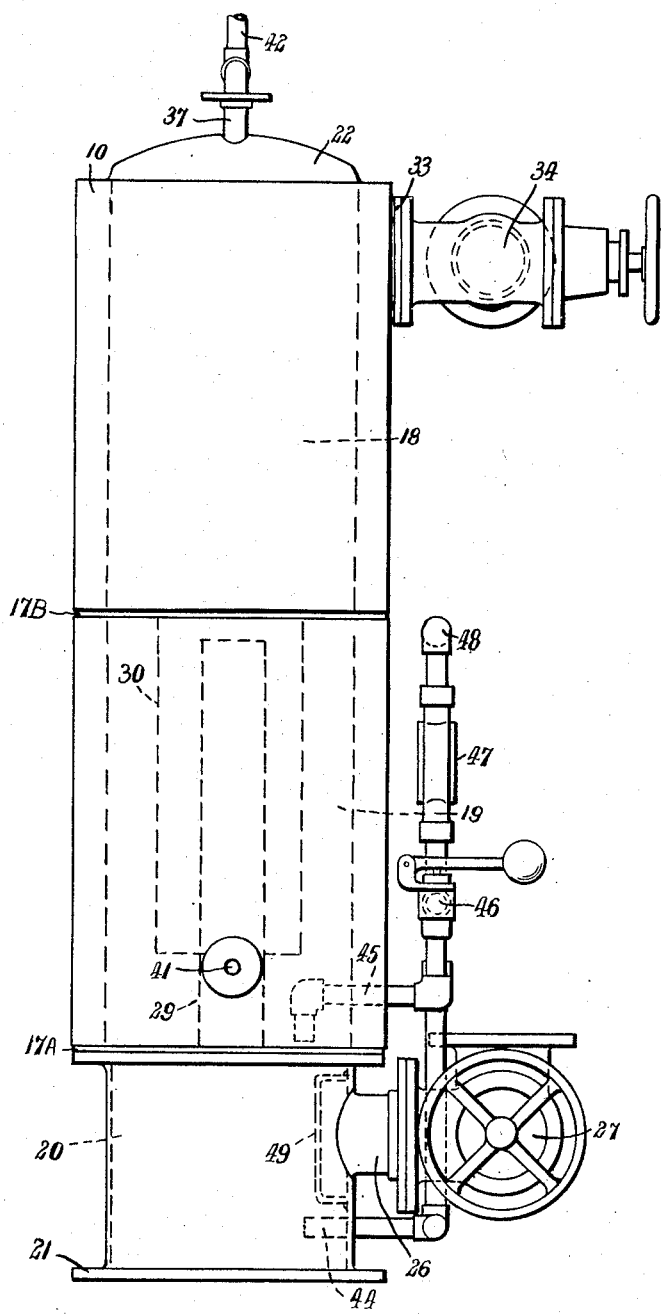
Figure 2 is an elevational view in the direction of the arrow in Figure 1.

The chamber 18 is provided with a thermometer 32 which can be read from outside the separator and a horizontal oil discharge pipe 33 (Figure 2), near the top of the chamber 18. Each discharge pipe 33 is connected through a valve 34 to a common main discharge pipe 35 leading to fuel pumps 36. An air return pipe 37 is connected between the top of the chamber 18 of each separator and a common air return pipe 38 which is in turn connected to the auxiliary tank 11. All pipes leading to and from the separators are arranged to be readily disconnectable therefrom in known manner.

A steam pipe 39 (Figure 1) is bent to form a 10½-turn helix and is located in the annular space between the two tubes 29 and 30. The pipe 39, as shown in Figure 1, is spaced equidistantly from both tubes but this need not be the case. The inlet end 40 of the steam pipe passes from the top of the chamber 18, vertically downward through the chamber and through a close-fitting aperture in the partition 17B. The outlet end 41 of the steam pipe passes horizontally out through the wall of the shell 12. The two inlet ends and the two outlet ends of the steam pipes are connected respectively to common inlet and outlet pipes 42 and 43.

Water drain pipes 44 and 45 (Figure 2) are provided for the chambers 20 and 19 respectively, the pipe 45 for the chamber 19 having its mouth located parallel and close to the bottom of the chamber. Each pipe is connected through a self-closing valve 46 to a common junction, the junction being connected through an observation glass 47 to a waste pipe 48 leading to the bilge, if on a ship, and to the hot-well, if on land.

Fuel entering the chamber 20 from the oil supply pipe 26 passes through or around the edge of a perforated distributing plate 49 (Figure 2) fixed in front of the supply port, the velocity of the oil and any tendency it might have to form eddies being thus reduced considerably. The oil then moves upwards through the inner tube 29, the sudden change of direction causing any impurity of higher specific gravity than the oil, e. g. silt and water, to tend to settle to the bottom of the chamber 20. It is found that all the silt settles in the chamber 20 but small quantities of water remain in the oil. When the oil reaches the end of the inner tube 29 it is turned into the annular space between the two tubes 29 and 30 and passes downwards over the heating coil 39, its temperature rising progressively and its viscosity decreasing progressively as it moves downwards. Since the specific gravity of the oil decreases as its temperatures rises, the oil tends to move in the direction opposite to its general direction of downward flow in the annular space. Further, the temperature of the wall of the outer tube 30, and therefore the temperature of the oil in contact therewith, is higher than the temperature of the wall of the inner tube 29. The effect is that the oil in the annular space eddies and tends to form vortices around the turns of the heating coil; the oil is thus brought into intimate contact with the heating coil and is heated uniformly throughout.

When the oil reaches the end of the second tube 30 it is turned abruptly into the annular space between the second tube and the shell 12, and the sudden change of direction causes the water remaining in the oil to be deposited on the bottom of the chamber 19. The oil then passes upwards through the apertures 31 in the partition 17B, these apertures preventing the oil from forming eddies as it passes into the chamber 18. From the chamber 18 the oil passes through the oil discharge pipe 33 to the fuel pumps 36. In this embodiment the length of steam-pipe passing through the chamber 18 helps to prevent the oil in the chamber 18 from cooling.

At intervals either of the two valves 46 in the water discharge pipes is operated, the fluid flow being noted by means of the observation glass 47. As each valve is opened, at first a little oil passes, then the separated water and then oil again, whereupon the valve is closed.

When the separator described is required to have a flow capacity of 20 tons per 24 hours the inner tube 29 is of 2½ ins. diameter and the outer tube 30 is of 7 ins. diameter, the mean diameter of the helix formed by the pipe 39 being 5 ins. The mean diameter of the helix is the arithmetic mean of its internal and external diameters.

For a flow capacity of 30 tons per 24 hours the diameters of the inner tube 29 and the outer tube 30 are 3 ins. and 7½ ins. respectively, the mean diameter of the helix being 5½ ins.

For a flow capacity of 40 tons per 24 hours the three diameters are 4 ins., 8½ ins. and 6½ ins. respectively and for a flow capacity of 50 tons per 24 hours they are 5 ins., 9½ ins. and 7½ ins. respectively.

In the four separators mentioned above the diameter of the pipe 39 is ¾ in.

We claim:

1. An apparatus for separating water from oil which comprises a cylindrical lower chamber, a second cylindrical chamber superposed on said lower chamber and a horizontal partition separating said chambers, an upstanding tubular conduit mounted on said partition, a concentric tube of larger diameter depending from the top of said superposed chamber; said upstanding conduit and depending tube defining, with the cylindrical wall of said superposed chamber, a passageway leading from the top of the lower chamber through the partition to the top of the upper chamber then downwardly through the annular space between the upstanding conduit and the depending tube and then upwardly through the annular space between the depending tube and the wall of the upper chamber; a helical heater mounted substantially centrally in said annular space between the upstanding conduit and the depending tube, inlet means for introducing an oil and water mixture to be separated into the bottom of said lower chamber, means for withdrawing separated oil from the top of the upper chamber and means for withdrawing separated water from the bottoms of the two chambers.

2. An apparatus for separating water from oil which comprises a vertical cylindrical casing, two horizontal partitions mounted in said casing and dividing it into a lower chamber, an upper chamber and a central chamber, a central upstanding tubular conduit mounted on the partition between the lower and the central chambers and extending to a point close to but below the top of the central chamber, a concentric tube of larger diameter mounted in the central chamber and depending from the partition separating the upper chamber from the central chamber, said concentric tube being spaced both from the central conduit and from the cylindrical casing leaving annular passageways therebetween, the said central tubular conduit, the concentric tube and the casing defining a sinuous passageway leading from the top of the lower chamber through said central conduit to a point close to the top of the central chamber then downwardly through the annular passageway between the central conduit and the depending concentric tube and then upwardly through the peripheral passageway between the casing and the depending concentric tube, the partition separating said upper chamber from the central chamber having openings connecting said peripheral passageway with the upper chamber to permit separated oil to flow into said upper chamber, a coaxial helical heater mounted in said annular passageway substantially midway between the central conduit and the depending concentric tube for heating the oil flowing downwardly through said passageway to temperatures causing entrained water to be separated therefrom, heating means mounted in said upper chamber to maintain the temperature of the oil, inlet means for introducing a mixture of oil and water to be separated into said lower chamber, means for withdrawing separated oil from the top of the upper chamber and means for withdrawing separated water from the bottoms of the central and the lower chambers.

3. An apparatus for separating water from oil which comprises a cylindrical lower chamber, a second cylindrical chamber superposed on said lower chamber and a horizontal partition separating said chambers, an upstanding tubular conduit mounted on said partition, a tube depending from the top of said second chamber into concentric relationship with said conduit; said upstanding conduit and depending tube defining, with the cylindrical wall of said second chamber, a passageway leading from the top of the lower chamber through the partition to the top of the second chamber then downwardly through the annular space between the upstanding conduit and the depending tube and then upwardly from the bottom of the second chamber to the top of the second chamber; a helical heater mounted substantially centrally in said annular space between the upstanding conduit and the depending tube, inlet means for introducing an oil and water mixture to be separated into the said lower chamber, means for withdrawing separated oil from the top of the second chamber, and means for withdrawing separated water from the bottoms of the two chambers.

References Cited in the file of this patent

UNITED STATES PATENTS

| Number | Name | Date |
|---|---|---|
| 1,490,794 | Alexander | Apr. 15, 1924 |
| 1,930,006 | Fox | Oct. 10, 1933 |
| 2,232,709 | Luetgert | Feb. 25, 1941 |
| 2,358,414 | Peavey | Sept. 19, 1944 |
| 2,546,269 | Lovelady | Mar. 27, 1951 |
| 2,562,653 | Williams | July 31, 1951 |
| 2,579,184 | Glasgow et al. | Dec. 18, 1951 |